United States Patent Office 2,987,308
Patented June 6, 1961

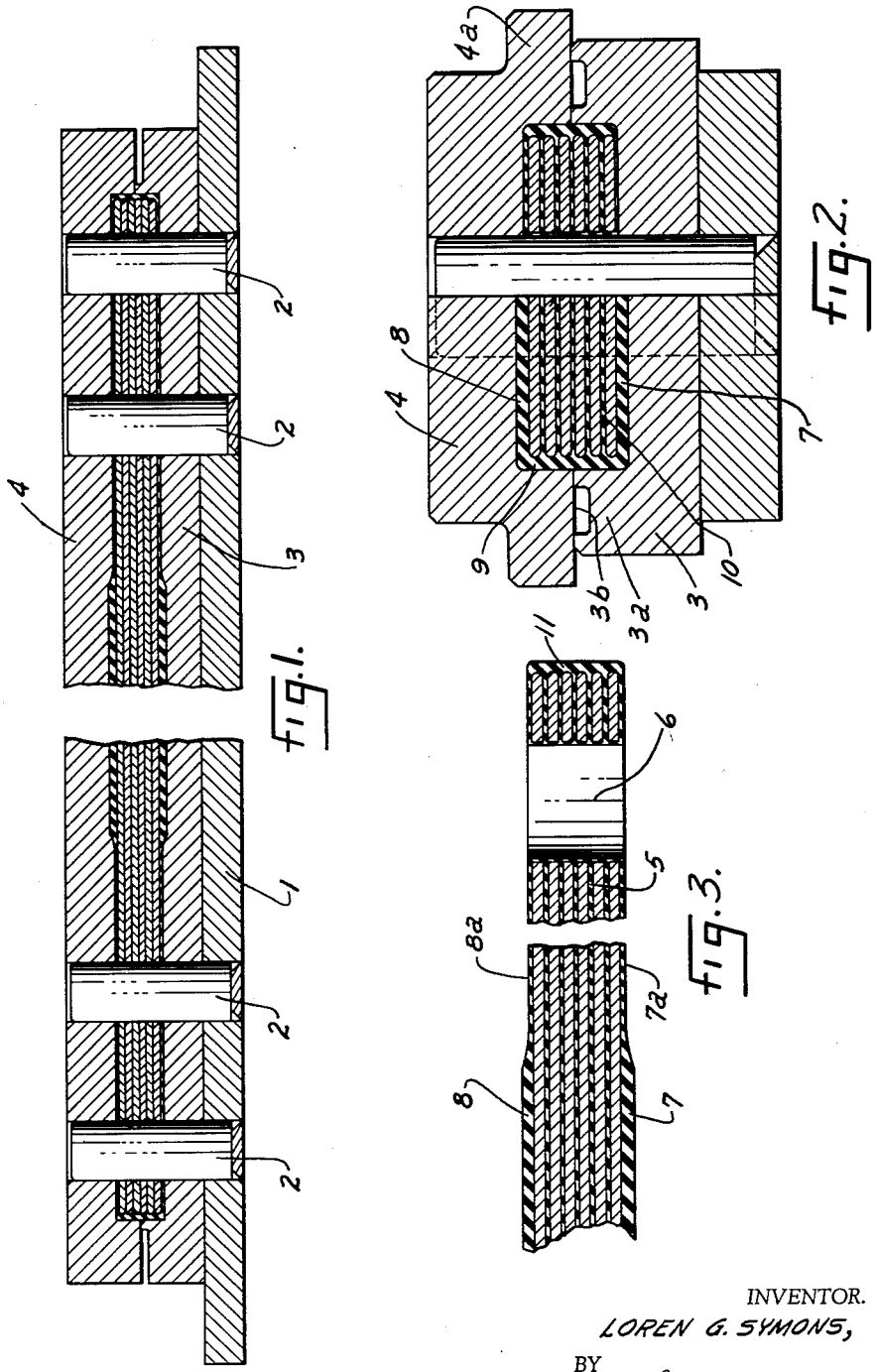

2,987,308
RUBBER COATED SPRING ASSEMBLIES
Loren G. Symons, North Hollywood, Calif., assignor to Nordberg Manufacturing Company, Milwaukee, Wis., a corporation of Wisconsin
Filed Aug. 8, 1957, Ser. No. 677,088
3 Claims. (Cl. 267—1)

My invention relates to an improvement in springs and has for one purpose to provide a multi-leaf spring assembly which can be made, packed, shipped and used as a unit.

Another purpose is to provide such a spring assembly in which a plurality of metallic leaves are completely or substantially completely enclosed in a sheath or casing of a material having the general characteristics, as to flexibility and water-tightness, of rubber or rubber substitutes.

Another purpose is to provide a coated leaf spring assembly having an outer layer of rubber-like material of varying thickness.

Another purpose is to provide such an assembly in which bolts or fastening members can pass through the entire group of leaves.

Another purpose is to provide an improved method of, and means for, coating an assembly of spring leaves.

Other purposes will appear from time to time in the course of the specification and claims.

I illustrate the invention more or less diagrammatically in the accompanying drawings wherein:

FIGURE 1 is a longitudinal section, with the central part omitted, illustrating a group of coated spring leaves positioned in a mold;

FIGURE 2 is a combined transverse section on an enlarged scale, the left half indicating a section through the thickest part of the assembly, intermediate the ends of the assembly and mold, and the right half indicating a section through one of the end portions of the assembly; and FIGURE 3 is a partial longitudinal section on the same scale as FIGURE 2.

Like parts are indicated by like symbols throughout the specification and drawings.

Referring to the drawings, 1 is any suitable base or support having upwardly extending centering members or pins 2. 3 is a lower mold element which may be removably positioned upon the pins 2, being apertured to permit the passage of the pins upwardly therethrough. 4 represents an upper mold element having a lower outwardly extending flange 4a which overlies the side walls 3a of the lower mold element 3. The walls 3a may be channeled as shown at 3b. The two molds between them define a space of the proper size to receive assembled leaf spring elements and their surrounding coating or layer of rubber or of a rubber substitute. In the particular exemplification of my invention herein shown, I illustrate six spring leaves 5. The number of the leaves and the specific shape and proportions may, of course, be varied to suit the problem to be solved. When the leaves are to be secured together as a group for the passage of bolts or securing members therethrough, they are apertured in alignment with each other. Such apertures are indicated, for example, at 6 in FIGURE 3. The mold elements of FIGURES 1 and 2 are proportioned to receive the desired number, length, width and thickness of spring leaves, and the spring leaves are all punched or formed to receive and slip over the pins or aligning elements 2 which project upwardly from the base 1. Assume that the individual leaves have been coated or brushed with rubber or a suitable substitute, and that they are then stacked in the mold, as shown in FIGURES 1 and 2, and are subjected to proper heat and proper pressure. The result is a binding together of the rubber or rubber substitute to produce the assembly, part of which is shown in FIGURE 3. There will be a surrounding coating, indicated in FIGURE 2 as having a lower layer 7, an upper layer 8, and opposite side layers 9 which are connected to the upper and lower layers 7 and 8. Likewise, intermediate layers 10 are at their edges continuous with the side layers 9 and, also, with the end layers, one of which is indicated at 11, at the right end of FIGURE 3.

One of the uses of such a bonded and protected bundle of spring leaves as is shown in the drawings herein is to serve as a supporting or actuating spring for vibrating screens. In such use a number of spring groups may be used, each secured at one end to a fixed screen base and at its other end to a deck supported by the base. There is, of course, a wide variety of spring arrangements used in screens, but one practical use is to provide a substantial number of the leaf spring assemblies herein described, angularly extending between a supporting base and a supported screen deck, the assemblies lying in parallel planes. Each end of each spring assembly may be clamped either to the screen deck or to the screen base. I, therefore, find it advantageous to form the upper and lower rubber layers 7 and 8 with thinned portions at the ends of each assembly, as illustrated at 7a and 8a in FIGURE 3. There is thus a minimum tendency for the shielding material to be squeezed out, or pressure extruded at the clamping areas.

I do not wish to be limited specifically as to material or dimensions, but where I employ a group of spring leaves in which the latex is painted or brushed on the leaves, an advantageous average thickness of the layers of rubber in the finished spring assembly may be an outside thickness of $3/32$-inch around the entire spring body and a thickness of about $1/32$-inch on the "flats" at the clamping areas, as shown, for example, at 7a and 8a in FIGURE 3. The thickness of the layers between the leaves may advantageously be of the order of $1/32$-inch. These thicknesses may be varied to a substantial degree. Thus, in effect, I provide an assembly of leaves which are completely held together in or embedded in a rubber or rubber-like structure in which the intermediate layers between leaves are unitary with or secured to the surrounding outside layers of the spring assembly.

I may, at the same time, if desired, provide a slight clearance between the guiding pins 2 and the apertures 6 of the leaf elements, which permits a skin of rubber to be formed there. However, this need not be critical and may be omitted, since the locking or clamping means themselves protect the ends of the apertures through the leaf spring assemblies.

It will be understood that the pressures and temperatures employed may be those customary in the industry and need not be given herein, since those skilled in the art will have no difficulty in curing the rubber or the neoprene, or other rubber substitute, which is employed.

It will be realized that whereas I have described and shown a practical and operative device, and a practical method and means for making it, many changes may be made in size, shape, number and disposition of parts, in the coating material used, and in steps taken, and in methods used, without departing from the spirit of my invention. I therefore wish my description and drawings to be taken as in a broad sense illustrative and diagrammatic rather than as limiting me to my specific showing herein. For example, whereas my invention can be used to great advantage with metallic leaf springs, leaves of other materials, including synthetics or plastics, may be employed. Whereas I prefer, under most circumstances, a coating of a material having the general characteristics of rubber or the usual rubber substitutes, I may employ other synthetics or plastics.

The use and operation of the invention are as follows:

I provide a rubber sealed leaf spring unit which has a wide application to situations where it is desirable to use a leaf spring or a leaf spring assembly under circumstances where the spring assembly is subjected to heat or heated liquids, or, in general, to situations where exposed spring leaves may be damaged. My invention has definite advantages also in shielding spring leaves or spring leaf assemblies from dust, grit and the like, as in connection with spring supports for screens or in actuating spring arms or connections for screens.

Assume that I wish to provide a rubber-sealed leaf spring assembly, I provide upper and lower mold elements, as shown at 3 and 4 in the drawings, which together define a cavity properly shaped and dimensioned to receive the entire spring assembly and to provide the appropriate thickness of rubber layer thereabout. When I use the term "rubber" it will be understood that I wish the term to be interpreted broadly enough to include any suitable rubber substitute. The individual leaves may be painted or coated with latex and laid in the mold, being aligned in their upper position by the passage of the pins 2 through the aperture 6 in the spring leaves. The upper mold 4 is then positioned on the pins 2 and suitable pressure and heat is applied by means not shown herein. Thereafter, the mold elements are separated and the coated unit, with the rubber or rubber substitute layers properly cured, is removed for use or storage.

A specific embodiment of my invention as I have used it is the employment of steel leaves molded, as above described, into a neoprene coating. Neoprene resists oil and grease somewhat better than does natural rubber and does not weather-check. I employ the temperatures and pressures customarily employed with neoprene. As the mold is made to press out excess material, there is, of course, some variation in pressure with the loading. While I do not wish to be limited to the use of neoprene, I do find it a practical substance to employ. Whereas I propose to employ steel leaves, it is possible to employ plastic leaves with a molded covering or sealing of rubber or neoprene. I may, for example, employ leaves of laminated and reinforced plastic. For example, I may mention the plastic, available on the market, in which sheets of plastic with glass filaments are laminated together.

I claim:

1. A spring structure for use in a vibrating screen assembly of the type in which a vibrating deck is supported above a fixed screen base, said spring structure being effective to cushion the vibrating impulses generated by the vibrating deck, said spring structure including, in combination, a plurality of generally planar spring leaves of substantially identical dimensions, each leaf being substantially longer than it is wide and substantially wider than it is thick, said leaves being disposed in stacked, generally parallel, overlying relationship whereby the terminal boundaries of said leaves are generally coextensive, a plurality of layers of resilient material having the same general characteristics as to flexibility, compressibility, and corrosion resistance as rubber interleaved between the opposing upper and lower surfaces of adjacent spring leaves, each of said layers being substantially longer than it is wide and substantially wider than it is thick and being securely bonded to the leaf surfaces between which it is disposed, said layers being generally coextensive with the spring leaves, and a casing having top, bottom, side and end portions composed of resilient material having the same properties as the interleaf layers and entirely encasing the stack of spring leaves, said casing being bonded to the interleaf layers, the inner surfaces of the casing being bonded to the outer surfaces of the spring leaves, said leaves and interleaf layers being constructed and arranged to form at least one aperture extending transversely completely through the stack adjacent each end thereof, the axis of each aperture being generally perpendicularly disposed to the planes of the spring leaves and resilient layers.

2. The spring structure of claim 1 further characterized in that those areas of the top and bottom portions of the casing lying between the apertures are substantially thicker than those areas of said portions in the immediate vicinity of the apertures to thereby provide depressed areas about the apertures which facilitates securement of a plurality of spring structures in stacked relationship to one another.

3. The spring structure of claim 1 further characterized by and including a generally vertically oriented layer of resilient material formed about the inner periphery of the apertures, said vertically oriented layer being integral with the abutting edges of the spring leaves and interleaf layers.

References Cited in the file of this patent

UNITED STATES PATENTS

| | | |
|---|---|---|
| 753,010 | Steinberger | Feb. 23, 1904 |
| 1,443,545 | Lord | Jan. 30, 1923 |
| 1,482,555 | Hall | Feb. 5, 1924 |
| 2,052,930 | Laursen | Sept. 1, 1936 |
| 2,062,760 | Overstrom | Dec. 1, 1936 |
| 2,559,105 | Banning | July 3, 1951 |
| 2,667,347 | Jacobs | Jan. 26, 1954 |
| 2,698,750 | Nicosia et al. | Jan. 4, 1955 |
| 2,712,159 | Marsch | July 5, 1955 |
| 2,795,844 | Liszak | June 18, 1957 |
| 2,799,050 | Traycoff | July 16, 1957 |
| 2,842,840 | Ploetz | July 15, 1958 |

FOREIGN PATENTS

| | | |
|---|---|---|
| 566,377 | Great Britain | Dec. 28, 1944 |
| 826,822 | Germany | Mar. 6, 1952 |